United States Patent
Brinchmann-Hansen

[11] Patent Number: 6,074,253
[45] Date of Patent: Jun. 13, 2000

[54] CONNECTING MEANS FOR TOWING CABLES

[75] Inventor: Per Brinchmann-Hansen, Oslo, Norway

[73] Assignee: Petroleum Geo-Services AS, Lysaker, Norway

[21] Appl. No.: 08/866,719

[22] Filed: May 30, 1997

[30] Foreign Application Priority Data

Jan. 5, 1995 [NO] Norway ................................ 95.0034
Dec. 13, 1995 [WO] WIPO ..................... PCT/N095/00233

[51] Int. Cl.⁷ ...................................................... H01R 9/03
[52] U.S. Cl. ............................................ 439/624; 439/640
[58] Field of Search ..................................... 439/640, 638, 439/624, 164, 165; 114/242, 253

[56] References Cited

U.S. PATENT DOCUMENTS

| | | |
|---|---|---|
| 3,016,868 | 1/1962 | Haas . |
| 3,350,678 | 10/1967 | McLoad ............................... 439/624 |
| 3,568,623 | 3/1971 | Gustavson et al. . |
| 3,786,410 | 1/1974 | Hazelhurst ............................ 439/301 |
| 4,574,723 | 3/1986 | Chiles et al. ......................... 114/253 |
| 4,756,268 | 7/1988 | Gjestrum et al. ..................... 114/242 |
| 4,798,156 | 1/1989 | Langeland et al. ................... 114/242 |
| 5,357,892 | 10/1994 | Vatne et al. . |
| 5,408,947 | 4/1995 | Curto et al. . |

FOREIGN PATENT DOCUMENTS 2 186 854  8/1987  United Kingdom .

Primary Examiner—Lincoln Donovan
Assistant Examiner—J. F. Duverne
Attorney, Agent, or Firm—Gordon T. Arnold

[57] ABSTRACT

A device (10) for connecting a towed seismic streamer (6) to a lead-in towing cable (7) and to a towing wire (8) is provided. The device (10) comprises a first connecting part (11) with coupling means (11A) for connecting to the foremost end of the streamer (6), a second connecting part (12) with coupling means (12A) for connecting to the end of the lead-in towing cable (7), and an intermediate part (15) having two connecting points (16, 17) for rotatable connection with the first and second connecting parts (11, 12), respectively. The device (10) also comprises a rotatable fastening member (20) for connecting to the towing wire (8) and a flexible conducting means (21) between the opposite ends of connecting parts (11, 12) for electric connection between streamer (6) and lead-in towing cable (7). The angles between the streamer (6), the lead-in towing cable (7), and the towing wire (8) are variable within limits.

57 Claims, 5 Drawing Sheets

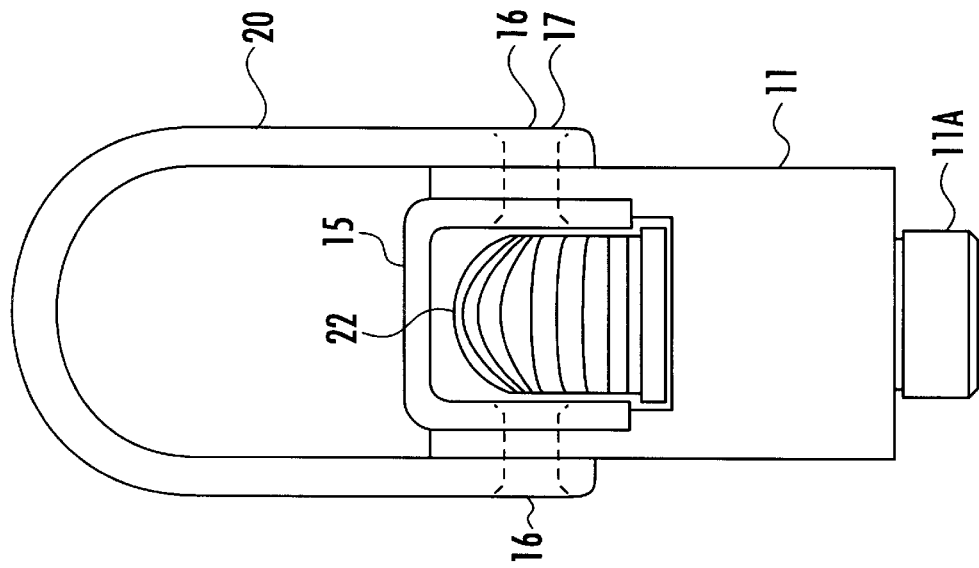
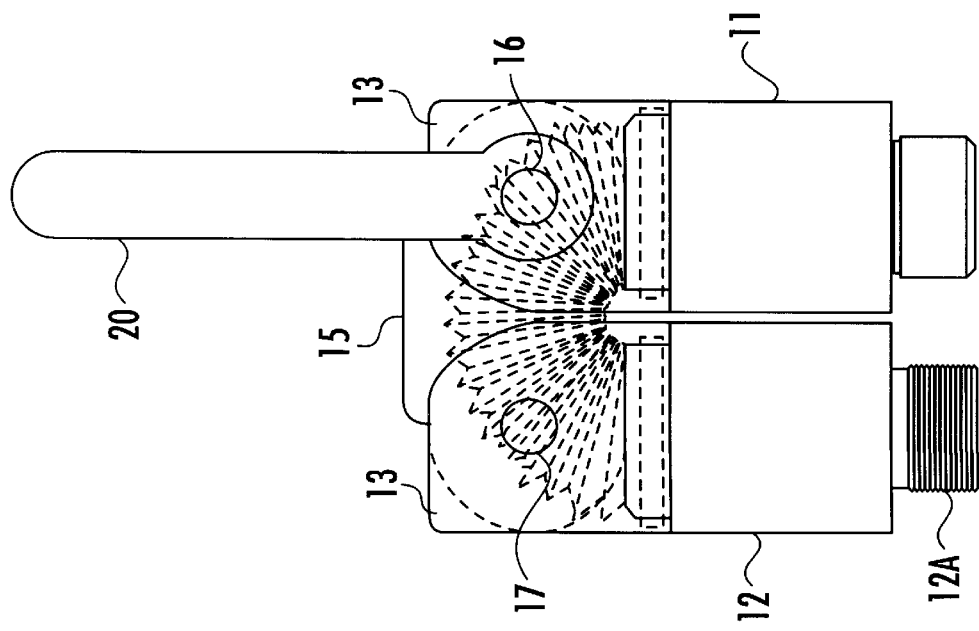

CONNECTING MEANS FOR TOWING CABLES

This invention relates to connecting means for towing seismic streamers (usually including hydrophones) from a seismic vessel.

In seismic exploration at sea, towing a number of parallel streamers from same vessel is becoming more common. Today using six seismic streamers is not unusual, and this number will probably increase.

When using five streamers, with a distance of 100 meters between them, the outermost will lie 200 meters laterally from the vessel. In practice this is done by using deflectors or similar devices to keep the cables separated laterally. The deflector is fastened to the streamers with a towing wire. Since it is preferred to keep the foremost end of the cable as close to the vessel as possible, the angle between the towing line and vessel's direction of movement, and thus the angle between the towing line and the streamers, will be large. This results in a large strain on the streamers and connectors due to the water resistance. Large water resistance on streamers and connectors will also make it harder to maintain the separation of the streamers in relation to the vessel. The streamers may also comprise a bundle of conductors for power supply and information. It would be advantageous to protect the bundle of conductors at the connection point.

Norwegian patent 158.259 shows an angular joint adapted for the mounting of a deflector to a streamer to keep the streamer in a position parallel to the vessel's direction of movement. This angular joint is disadvantage because it has a large cross section, thus having a large drag in the water, which will lead to strain on the streamer and limitations regarding the position of the streamer. Norwegian patent 158.259 also relates to a joint adapted to be mounting on the outside of an existing cable, and does not comprise the actual connection between the towing cable and the streamer.

To reduce the strain on streamers and connection points, it is an object of the present invention to provide a connection between a towing wire, a towing cable and a streamer, the connection being sufficiently robust to protect the bundle of conductors, and still compact enough to not add significantly to the water resistance of the system. It should also be easy to mount, and thereby reducing the safety risk related to mounting.

Therefore, according to one embodiment of the invention, a connecting device for use at the forward part of seismic cables, hereafter called hydrophone cables, is provided, which is adapted to being towed by a seismic vessel in which the foremost end of the seismic cable is connected to a towing wire and also to a towing cable (lead-in) which, in addition, comprises electric connection between the vessel and the hydrophone cable. The angles between the hydrophone cable, the towing wire, and the towing cable are variable. A first connecting part with coupling means for connecting to the foremost end of the hydrophone cable is provided in this embodiment along with a second connecting part with coupling means for connecting to the end of the towing cable, an intermediate part with two connecting points for rotatable connection with the first and the second connecting part, respectively, at an opposite side or end in relation to said coupling means, flexible conducting means between said opposite sides or ends of the connecting parts for electric connection between the hydrophone cable and the towing cable, and a fastening member for the towing wire.

According to a further embodiment, protective bellows are provided covering the said conducting means. According to still a further embodiment, the bellows is replaceable. According to yet another embodiment, the said conducting means are replaceable; while, in still another embodiment, the fastening member for the towing wire is rotatably mounted at one of the connecting points. In yet another embodiment, the fastening member for the towing wire is mounted at the same connecting point as the first connecting part; and, in still another, the intermediate part is made in one piece with an essentially U-shaped cross-section. In an even further embodiment, the connecting parts are provided with a part serving to bring the connecting parts into engagement with each other when the connecting device is unfolded and thus prevent unfolding of the connecting device beyond 180°.

An example of connecting means according to the invention is described with reference to the accompanying drawings:

FIG. 3 shows the connecting means with maximum bend as seen from two sides.

Figure 2:
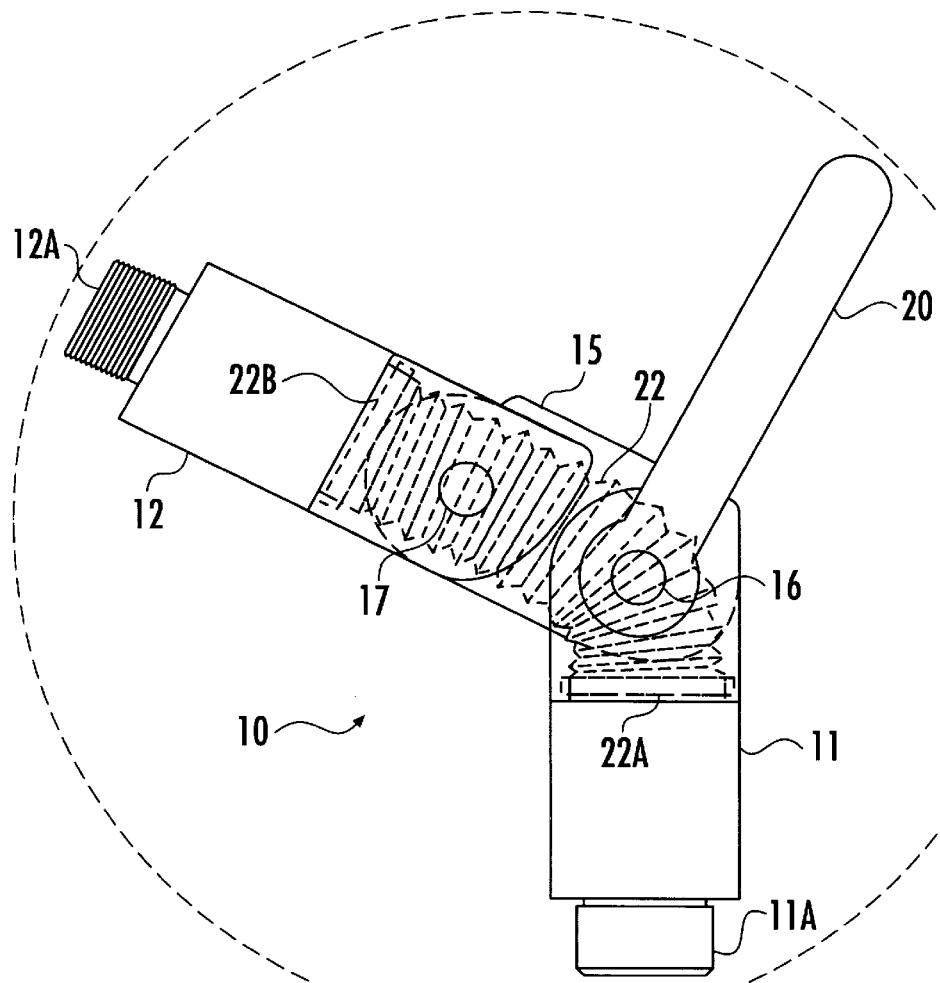
FIG. 2 shows a connecting means according to the invention while in use.
Figure 5:
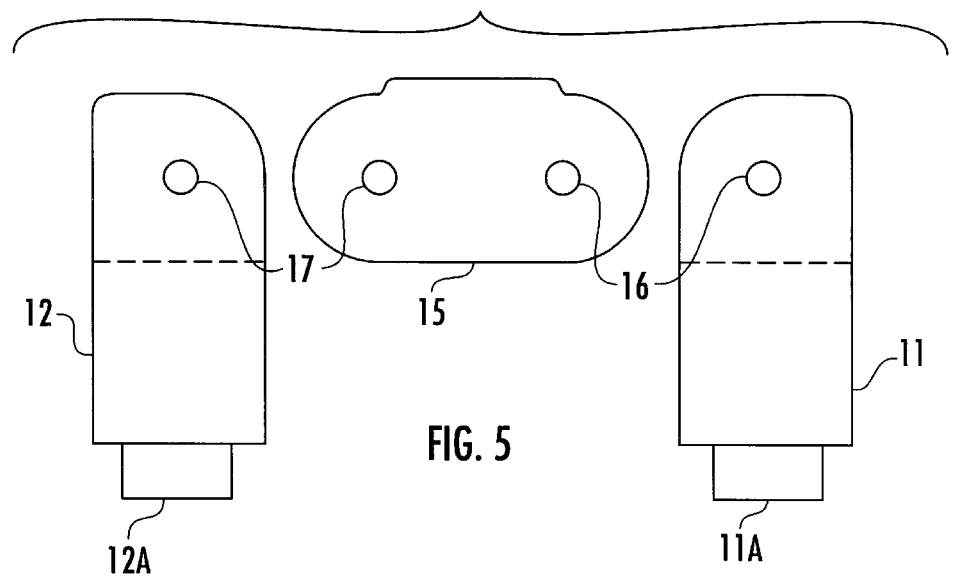

FIG. 5 is an exploded view of connecting parts 11 and 12 and intermediate part 15 of the connecting means of FIGS. 2 and 3, with the remaining parts omitted for the sake of clarity.

Figure 6:
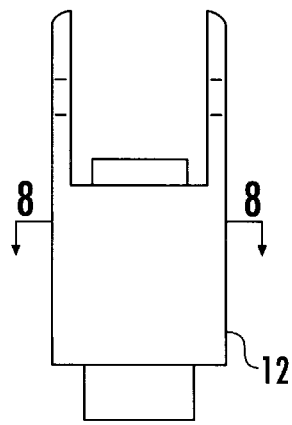

FIG. 6 is a side elevation view of connecting part 12, turned 90° with respect to its orientation in FIG. 5.

Figure 7:
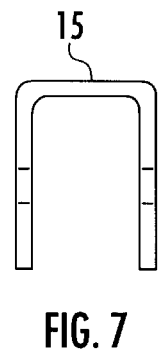

FIG. 7 is an end elevation view of intermediate part 15, turned 90° with respect to its orientation in FIG. 5.

Figure 8:
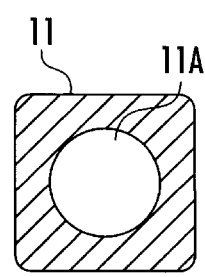

FIG. 8 is a cross-sectional view of connecting part 12, taken along line 8—8 in FIG. 6.

Figure 1:
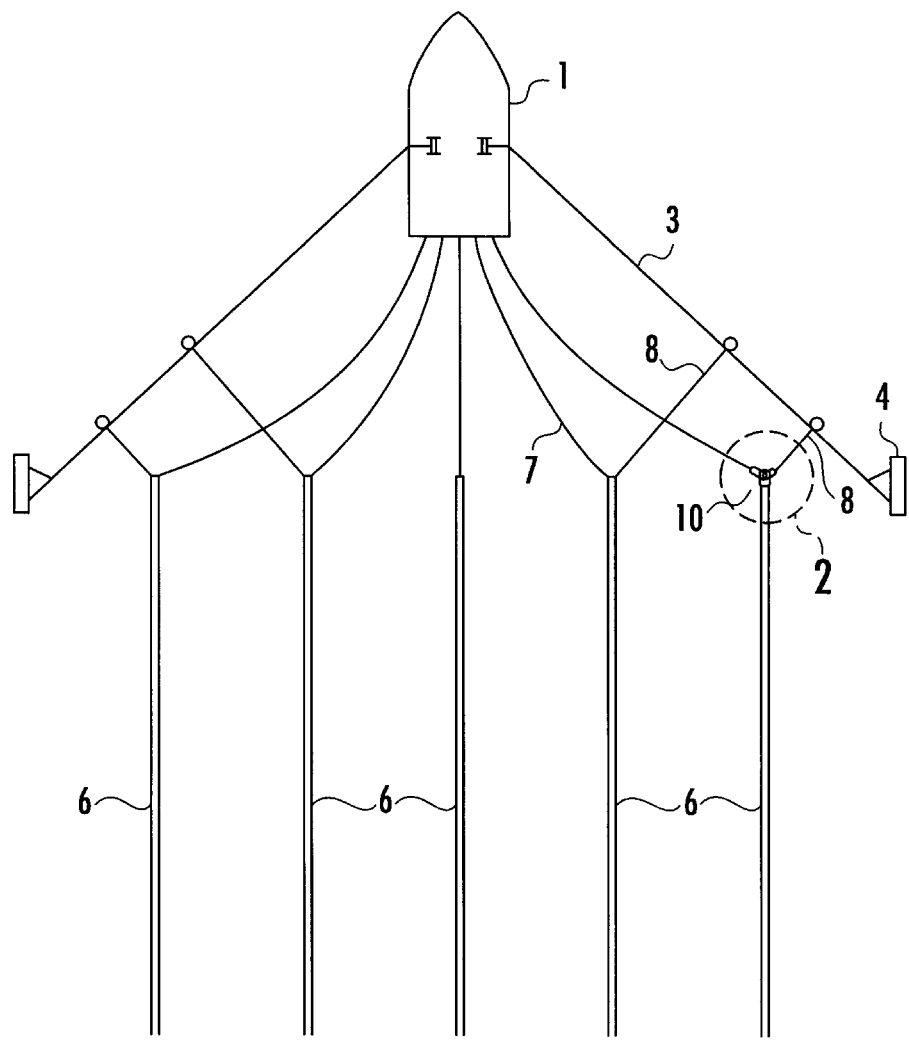
FIG. 1 shows the connecting means as it would work in a system with five streamers.

FIG. 1 shows a vessel 1 with a possible setting of five streamers. The figure only shows use of the connecting means on one of the cables, but it may of course also be used on the other cables.

The streamers are pulled out from the vessel 1 by means of a deflector 4, or similar device, hanging in a wire 3 after the vessel. To this wire 3 the foremost end of the towing wire 8 is attached. The towing cable 7 is hanging relatively loosely behind the vessel 1 and is connected to the towing wire 8 and the streamer 6 using the connecting means 10.

Other arrangements, for example, connecting the deflector directly to the towing wire 8, are also possible.

FIG. 2 shows the present connecting means 10 as comprising two connecting parts 11 and 12. The connecting parts are provided with coupling means for coupling to the streamer 6 and the towing cable 7 in 11A and 12A, respectively. The coupling means consists of ordinary threaded couplings. The connecting parts 16 and 17 are rotatably connected to an intermediate part 15, preferrably in such a way that they are allowed to rotate relative to the intermediate part and relative to the parallel axis perpendicular to the axis of the cable. The possibility to rotating relative to the axis of the cable is also contemplated. The towing wire 8 is fixed to the connecting means 10 with a fastening member 20, being rotatably mounted at the connecting point 16 between the intermediate part 15 and the streamer 6 connecting part 11. A bundle of conductors (shown in FIG. 4) providing for a connection between the towing cable and the streamer is placed centrally in the connecting means and is, in this figure, covered by bellows 22. The bellows 22 are replaceable and are coupled to the connecting means with hose clamps 22A, 22B.

FIG. 3 shows the connecting means folded, as seen from two sides. The intermediate part 15 is made in one piece with a U-shaped cross section and thus partly covers the bellows and the bundle of conductors for protection thereof.

FIG. 3 also shows a preferred embodiment of the connecting parts 11 and 12. If mounted as shown in the figure, one corner 13 of the connecting parts will keep the connecting means from being bent more than 180° from the position shown. This is done to protect the bundle of conductors. Other methods may of course be used to obtain the same, for example, providing an intermediate part 15 with a shape that prevents bending beyond 180°.

Figure 4:
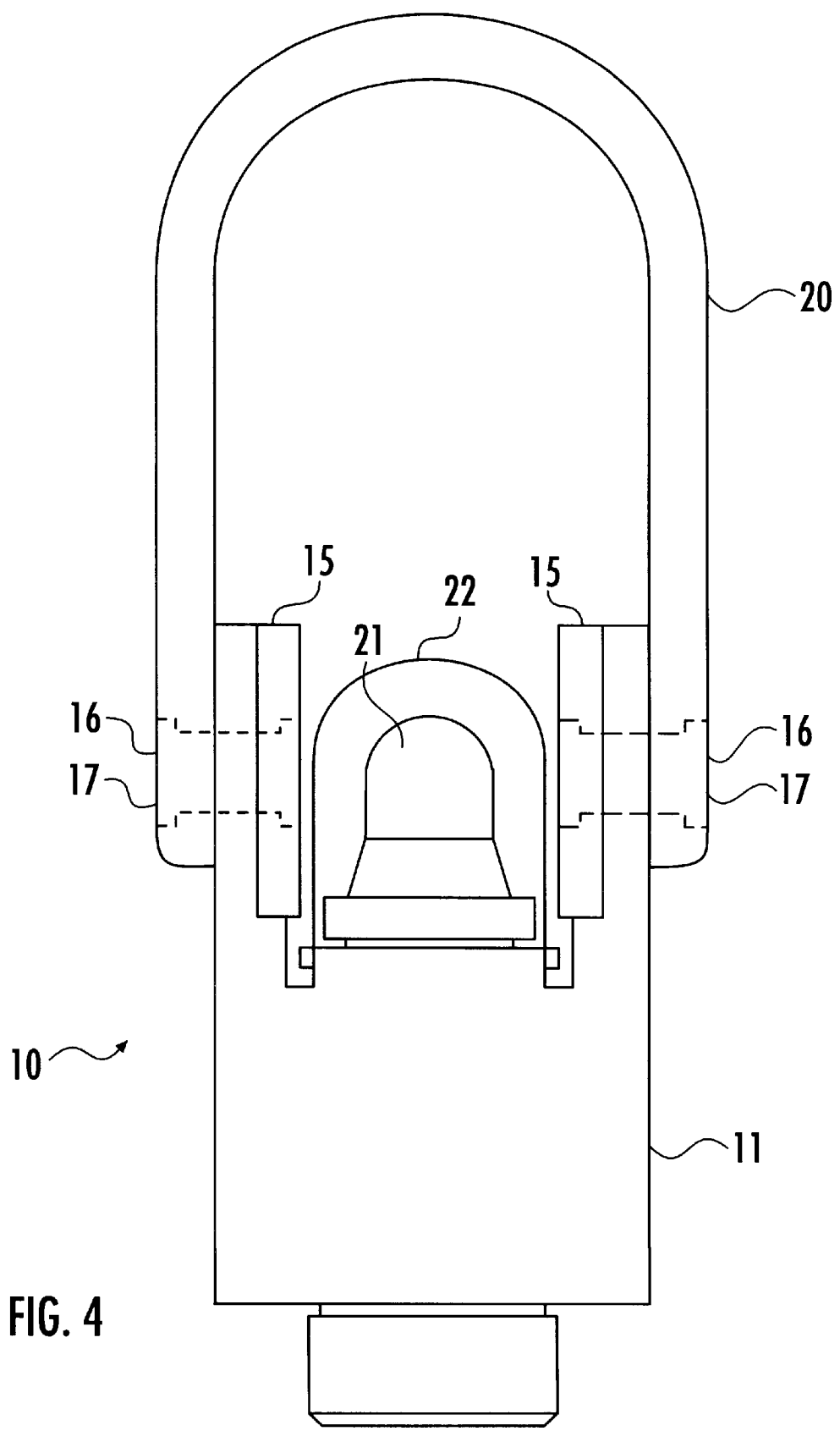
FIG. 4 shows a slightly different connecting means than that which is shown in the right part of FIG. 3.

FIG. 4 shows a cross section of a slightly modified version of the connecting means in which the intermediate part 15 consists of two separate parts, mounted on each side of the bundle of conductors. The connecting part 11, the intermediate parts 15 and the towing wire fastening member 20 are fastened to each other using standard bolts or similar fastening devices.

FIG. 4 also shows the bundle of conductors 21 mounted inside the bellows 22. The bundle of conductors 21 is capable of being changed in case of damage.

I claim:

1. A connecting device for use with seismic cables, hereafter called hydrophone cables, having a forward and formost end, the hydrophone cable adapted to being towed by a seismic vessel in which the formost end of the hydrophone cable is connected to a towing wire at its end and also to a towing cable (lead-in) at its end, such that angles are formed between the hydrophone cable, the towing wire, and the towing cable, which in addition comprises electric connections between the seismic vessel and the hydrophone cable, and where the angles between the hydrophone cable, the towing wire, and the towing cable are variable, characterized by a first connecting part with coupling means for connecting to the formost end of the hydrophone cable, a second connecting part with coupling means for connecting to the end of the towing cable, an intermediate part with two connecting points for rotatable connection with the first and the second connecting part, respectively, at an opposite side or end in relation to said coupling means, flexible conducting means between said opposite sides or ends of the connecting parts for electric connection between the hydrophone cable and the towing cable, and a fastening member for the towing wire.

2. Connecting device according to claim 1, characterized in that protective bellows are provided covering the flexible conducting means.

3. Connecting device according to claim 2, characterized in that the protective bellows is replaceable.

4. Connecting device according to claim 1, characterized in that the flexible conducting means are replaceable.

5. Connecting device according to claim 1, characterized in that the fastening member for the towing wire is rotatably mounted at one of the connecting points.

6. Connecting device according to claim 5, characterized in that the fastening member for the towing wire is mounted at the same connecting point as the first connecting part.

7. Connecting device according to claim 1, characterized in that the intermediate part is made in one piece with an essentially U-shaped cross-section.

8. Connecting device according to claim 1, characterized in that the connecting parts are each provided with a part serving to bring the connecting parts into engagement with each other when the connecting device is unfolded and thus prevent unfolding of the connecting device beyond 180°.

9. A process for connecting a streamer having a foremost part to a towing cable, and to a towing wire such that variable angles are formed between the streamer, the towing wire, and the towing cable, said process comprising:

connecting the foremost part of the streamer to a first connecting part;

connecting the towing cable to a second connecting part;

providing a flexible conductor between the first connecting part and the second connecting part through an intermediate part, the intermediate part being connected to the first connecting part and the second connecting part;

connecting a first end of the flexible conductor to the foremost part of the streamer;

connecting a second end of the flexible conductor to the towing cable;

wherein at least one of the first or second connecting parts is flexibly connected to the intermediate part.

10. A process for connecting as in claim 9 further comprising flexibly connecting the intermediate part to the towing wire.

11. A process for connecting as in claim 10 wherein said connecting of the first connecting part to the intermediate part defines a first connecting point and wherein said connecting of the second connecting part to the intermediate part defines a second connecting point, and further comprising flexibly connecting a towing wire fastener to at least one connecting point.

12. A process for connecting as in claim 11 further comprising covering the flexible conductor.

13. A process for connecting as in claim 12 further comprising providing means to prevent unfolding of the connecting device beyond 180°.

14. A process for connecting as in claim 9 further comprising covering the flexible conductor.

15. A process for connecting as in claim 14 further comprising flexibly connecting the intermediate part to the towing cable.

16. A process for connecting as in claim 15 further comprising providing means to prevent unfolding of the connecting device beyond 180°.

17. A process for connecting as in claim 9 further comprising flexibly connecting the intermediate part to the towing wire and preventing unfolding of the connecting device beyond 180°.

18. A process for connecting as in claim 9 further comprising providing means to prevent unfolding of the connecting device beyond 180°.

19. A process for connecting as in claim 18 wherein said connecting the first connecting part to the intermediate part defines a first connecting point and wherein said connecting the second connecting part to the intermediate part defines a second connecting point, and further comprising flexibly connecting a towing wire fastener to at least one connecting point.

20. A process for connecting as in claim 9 wherein said connecting the first connecting part to the intermediate part defines a first connecting point and wherein said connecting the second connecting part to the intermediate part defines a second connecting point, and further comprising flexibly connecting a towing wire fastener to at least one connecting point.

21. A connecting device for use with a streamer having a foremost end, the streamer adapted to being towed by a seismic vessel, in which the foremost end of the streamer is connected to a towing wire, and also to a towing cable such that angles are formed between the streamer, the towing wire, and the towing cable, wherein the angles between the streamer, the towing wire and the towing cable are variable, the connecting device comprising:

a first connecting part;

a second connecting part;

an intermediate part with a first connector end adapted for pivotal connection with at least one of said first connecting part or said second connecting part, and a second connector end adapted for connection with at least one of said first connecting part or said second connecting part; and a flexible conductor located between said first and said second connector ends.

22. A connecting device as in claim 21 further comprising a towing wire fastener connected to said intermediate part.

23. A connecting device as in claim 22 wherein said first connecting part and said intermediate part define a first connecting point and wherein said second connecting part and said intermediate part define a second connecting point and wherein said towing wire fastener is mounted to at least one of said connecting points.

24. A connecting device as in claim 23 wherein said flexible conductor is replaceable.

25. A connecting device as in claim 24 further comprising a covering for said flexible conductor.

26. A connecting device as in claim 25 wherein said covering comprises a sleeve covering said flexible conductor.

27. A connecting device as in claim 26 wherein said sleeve is replaceable.

28. A connecting device as in claim 26 wherein said sleeve comprises a protective bellows that is provided for covering said flexible conductor.

29. A connecting device as in claim 28 wherein said bellows is replaceable.

30. A connecting device as in claim 25 wherein said intermediate part comprises a unitary member with an essentially U-shaped cross section.

31. A connecting device as in claim 30 wherein said connecting parts prevent unfolding of said connecting device beyond 180°.

32. A connecting device as in claim 21 wherein said flexible conductor is replaceable.

33. A connecting device as in claim 32 wherein said connecting parts prevent unfolding of said connecting device beyond 180°.

34. A connecting device as in claim 32 wherein said intermediate part comprises a unitary member with an essentially U-shaped cross section.

35. A connecting device as in claim 34 wherein said connecting parts prevent unfolding of said connecting device beyond 180°.

36. A connecting device as in claim 21 further comprising a towing wire fastener and a covering for said flexible conductor.

37. A connecting device as in claim 21 further comprising a towing wire fastener wherein said intermediate part comprises a unitary member with an essentially U-shaped cross section.

38. A connecting device as in claim 21 further comprising a towing wire fastener wherein said flexible conductor is replaceable.

39. A connecting device as in claim 38 wherein said first connecting part and said intermediate part define a first connecting point and wherein said second connecting part and said intermediate part define a second connecting point and wherein said towing wire fastener is mounted to at least one of said connecting points.

40. A connecting device as in claim 39 wherein said connecting parts prevent unfolding of said connecting device beyond 180°.

41. A connecting device as in claim 40 further comprising a towing wire fastener, wherein said connecting parts prevent unfolding of said connecting device beyond 180°.

42. A connecting device as in claim 21 wherein said connecting parts prevent unfolding of said connecting device beyond 180°.

43. A connecting device as in claim 42 wherein the shape of said first or second connecting parts prevents unfolding of said connecting device beyond 180°.

44. A connecting device as in claim 42 wherein the position of said first or second connecting parts prevents unfolding of said connecting device beyond 180°.

45. A connecting device as in claim 21 wherein the shape of said intermediate part prevents unfolding of said connecting device beyond 180°.

46. A connecting device as in claim 21 wherein the position of said intermediate part prevents unfolding of said connecting device beyond 180°.

47. A connecting device as in claim 22 wherein the shape of said towing wire fastener prevents unfolding of said connecting device beyond 180°.

48. A connecting device as in claim 22 wherein the position of said towing wire fastener prevents unfolding of said connecting device beyond 180°.

49. A connecting device as in claim 21 wherein said flexible conductor prevents unfolding of said connecting device beyond 180°.

50. A connecting device as in claim 21 further comprising a stop part adapted to prevent unfolding beyond 180°.

51. A connecting device as in claim 50 wherein said stop part is adapted and arranged for placement between said first and said second connecting parts.

52. A connecting device as in claim 50 wherein said stop part is adapted and arranged for placement outside said first connecting part.

53. A connecting device as in claim 50 wherein said stop part is adapted and arranged for placement outside of said second connecting part.

54. A connecting device as in claim 50 wherein said stop part is adapted and arranged for placement inside said intermediate part.

55. A connecting device as in claim 50 wherein said stop part is adapted and arranged for placement outside said intermediate part.

56. A connecting device as in claim 50 wherein said stop part is adapted and arranged as an extension of said first connecting part.

57. A connecting device as in claim 50 wherein said stop part is adapted and arranged as an extension of said second connecting part.

* * * * *

UNITED STATES PATENT AND TRADEMARK OFFICE
CERTIFICATE OF CORRECTION

PATENT NO : 6,074,253

DATED : June 13, 2000

INVENTOR(S) : Per Brinchmann-Hansen

Page 1 of 2

It is certified that error appears in the above-identified patent and that said Letters Patent are hereby corrected as shown below:

In Column 1, Line 8, "streamers from same vessel" should read -- streamers from the same vessel --.

In Column 1, Line 29, the word "disadvantage" should read -- disadvantageous --.

In Column 1, Line 33, "joint adapted to be mounting" should read -- joint adapted for mounting --.

In Column 1, Line 34, the word "cable" should read -- streamer --.

In Column 2, Line 22, "FIG 3" should read -- FIG 3A --.

In Column 2, Line 23, "from two sides" should read -- from the front --.

In Column 2 Between Lines 23 and 24, add -- FIG 3B shows the connecting means with maximum bend as seen from the side.

In Column 2, Line 25, "shown in the right part of FIG. 3." should read -- shown in FIG. 3B. --.

In Column 2, Lines 27-28, "FIGS. 2 and 3," should read – FIGS. 2, 3A, and 3B, --.

In Column 2, Line 41, the word "in" should read -- on --.

In Column 2, Line 57, "possibility to rotating" should read -- possibility of rotating --.

In Column 3, Line 1, "FIG. 3" should read -- FIG. 3A --.

In Column 3, Lines 1-2, "from two sides." should read -- from the front. FIG. 3B is a side elevation view of the folded connecting means of FIG. 3A. --.

Continued on page 2

UNITED STATES PATENT AND TRADEMARK OFFICE
CERTIFICATE OF CORRECTION

PATENT NO : 6,074,253
DATED : June 13, 2000
INVENTOR(S) : Per Brinchmann-Hansen

It is certified that error appears in the above-identified patent and that said Letters Patent are hereby corrected as shown below:

Column 3, Line 5, "FIG. 3" should read -- FIGS. 3A and 3B --.

Column 3, Line 6, "in the figure," should read -- in these figures, --.

Column 3, Line 10, "same, for" should read -- same result, for --.

Signed and Sealed this

Twenty-second Day of May, 2001

NICHOLAS P. GODICI

*Attest:*

*Attesting Officer*   *Acting Director of the United States Patent and Trademark Office*